United States Patent
Chapman et al.

(10) Patent No.: US 11,675,782 B2
(45) Date of Patent: *Jun. 13, 2023

(54) SYSTEMS AND METHODS FOR DISPARATE DATA SOURCE AGGREGATION, SELF-ADJUSTING DATA MODEL AND API

(71) Applicant: SAP SE, Walldorf (DE)

(72) Inventors: Stacy Chapman, San Francisco, CA (US); Satish Sallakonda, Dublin, CA (US); Arun Radhakrishnan, Fremont, CA (US)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/645,242

(22) Filed: Dec. 20, 2021

(65) Prior Publication Data

US 2022/0114167 A1    Apr. 14, 2022

Related U.S. Application Data

(63) Continuation of application No. 16/172,755, filed on Oct. 27, 2018, now Pat. No. 11,216,452.

(60) Provisional application No. 62/580,027, filed on Nov. 1, 2017.

(51) Int. Cl.
| | |
|---|---|
| *G06F 16/00* | (2019.01) |
| *G06F 16/242* | (2019.01) |
| *G06F 9/54* | (2006.01) |
| *G06F 16/25* | (2019.01) |
| *G06F 16/335* | (2019.01) |
| *G06F 40/279* | (2020.01) |

(52) U.S. Cl.
CPC ............. *G06F 16/244* (2019.01); *G06F 9/54* (2013.01); *G06F 16/25* (2019.01); *G06F 16/337* (2019.01); *G06F 40/279* (2020.01)

(58) Field of Classification Search
CPC ...... G06F 16/244; G06F 40/279; G06F 16/25; G06F 16/337; G06F 9/54
See application file for complete search history.

(56) References Cited

U.S. PATENT DOCUMENTS

| | | | |
|---|---|---|---|
| 9,600,602 B2 | 3/2017 | Natarajan et al. | |
| 9,654,594 B2* | 5/2017 | B'Far | H04L 63/20 |
| 2003/0126156 A1 | 7/2003 | Stoltenberg et al. | |

(Continued)

*Primary Examiner* — Jared M Bibbee
(74) *Attorney, Agent, or Firm* — Fish & Richardson P.C.

(57) ABSTRACT

A disparate data source aggregation system and methods are provided which may pull or retrieve talent data or features from disparate data sources, automatically correlate the data across the different data sources, build a self-adjusting system database that captures the talent data from the disparate data sources, and lets users search, query and build model insights on the aggregated data of the system database without human intervention. A method for disparate data source aggregation may include: extracting a first feature set having a first extracted feature and a second feature set having a second extracted feature; determining, if the first extracted feature of the first feature set matches the second extracted feature of the second feature set; and aggregating the first feature set with the second feature set if the first extracted feature of the first feature set matches the second extracted feature of the second feature set.

20 Claims, 11 Drawing Sheets

(56) References Cited

U.S. PATENT DOCUMENTS

| | | | |
|---|---|---|---|
| 2003/0182171 A1* | 9/2003 | Vianello | G06Q 10/063112 |
| | | | 705/7.14 |
| 2010/0114672 A1* | 5/2010 | Klaus | G09B 7/00 |
| | | | 705/7.14 |
| 2011/0231329 A1* | 9/2011 | Vianello | G06Q 10/1053 |
| | | | 705/321 |
| 2012/0117092 A1* | 5/2012 | Stankiewicz | G06F 16/3329 |
| | | | 707/755 |
| 2013/0031090 A1* | 1/2013 | Posse | G06F 16/248 |
| | | | 707/723 |
| 2013/0166465 A1* | 6/2013 | Barros | G06Q 10/1053 |
| | | | 705/319 |
| 2016/0217216 A1* | 7/2016 | Baird | G06Q 10/10 |
| 2016/0217427 A1* | 7/2016 | Baird | G06Q 10/1053 |
| 2016/0275455 A1* | 9/2016 | Moll | G06Q 50/01 |
| 2016/0342699 A1* | 11/2016 | Shen | G06Q 30/0269 |
| 2016/0357790 A1 | 12/2016 | Elkington et al. | |
| 2019/0129996 A1 | 5/2019 | Chapman et al. | |

\* cited by examiner

AGGREGATED PROFILE RECORD 150

NAME 151

CURRENT EMPLOYER 152

PREVIOUS EMPLOYER 1 153

PREVIOUS EMPLOYER 2 154

CURRENT JOB TITLE 155

PREVIOUS JOB TITLE 1 156

PREVIOUS JOB TITLE 2 157

CONTACT ADDRESS 158

CONTACT PHONE NUMBER 159

EDUCATION 160

CERTIFICATIONS 161

*FIG. 9*

SYSTEMS AND METHODS FOR DISPARATE DATA SOURCE AGGREGATION, SELF-ADJUSTING DATA MODEL AND API

CLAIM OF PRIORITY

This application claims priority under 35 USC § 120 to U.S. patent application Ser. No. 16/172,755 filed on Oct. 27, 2018, entitled "SYSTEMS AND METHODS FOR DISPARATE DATA SOURCE AGGREGATION, SELF-ADJUSTING DATA MODEL AND API"; which claims priority under 35 USC § 119(e) to U.S. Provisional Patent Application Ser. No. 62/580,027, filed on Nov. 1, 2017, entitled "SYSTEMS AND METHODS FOR DISPARATE DATA SOURCE AGGREGATION, SELF-ADJUSTING DATA MODEL AND API"; the entire contents of each and together are hereby incorporated by reference in its entirety.

FIELD OF THE INVENTION

This patent specification relates to the field of data processing and data management. More specifically, this patent specification relates to systems and methods that are configured to enable data processing and data management by aggregating data from disparate data sources.

BACKGROUND

Talent systems, such as LinkedIn, Indeed and internal talent data are used to store and maintain data describing various individuals typically in a job-seeking or employment history or skills context. Numerous talent system websites exist and new ones are being launched frequently. Most people who use a talent system are members of more than one talent system website or database.

Talent systems have their own unique data models and can contain both structured and unstructured data on a plurality of individuals. This data is commonly organized based on one or more identifiers that are unique to each individual. An Applicant Tracking System (ATS) is one example. In an ATS system, the system primarily tracks candidates and their related profile data, and the unique identifier could be candidate id or email address or any other attribute that identifies the candidate. Another example is a Human Resources Information System (HRIS). A HRIS system primarily tracks employees, their internal job history and performance review data. In HRIS systems, the unique identifier could be employee ID number, social security number, or any other attribute that identifies the employee. A third example is a Candidate Relationship Management (CRM) system. A CRM system manages Talent pipeline, prospects, their interests, willingness to relocate, potential job titles, etc. In CRM systems, the unique identifier could be a contact ID number, email address or any other attribute that identifies the contact.

To bring all the data together from different talent systems and create an aggregated profile normally requires an army of developers who understand these systems well and understand the unique identifier in each of these systems. Developers build programs to import the data from these systems into staging tables. These programs use traditional SQL joins on the unique identifiers to identify datasets that overlap across systems, build temporary tables to move the data into a single aggregated profile. Any time the data model or attributes change in the source system, the whole development cycle starts over again to recreate these temporary tables, capture the new data model, attributes and pull them all together. If there is no unique identifier in the source system, the developers run into a roadblock.

Therefore, a need exists for novel systems and methods for data processing and data management for talent systems. A further need exists for novel systems and methods that are configured to enable data processing and data management by aggregating data from disparate data sources. Finally, a need exists for novel systems and methods for talent data from disparate systems, automatically correlates Talent data across systems, builds a self-adjusting data model that captures data from disparate systems and lets users search, query and build model insights on the aggregated data sets without human intervention.

BRIEF SUMMARY OF THE INVENTION

Systems and computer implemented methods for disparate data source aggregation, self-adjusting data model and API may include a disparate data source aggregation system which may pull or retrieve talent data from disparate data sources, automatically correlates the data across the different data sources, build a self-adjusting system database that captures the talent data from the disparate data sources, and lets users search, query and build model insights on the aggregated data of the system database without human intervention.

In some embodiments, a computer implemented method for disparate data source aggregation is provided. The method may include the steps of: extracting, via a computing device processor, a first feature set having a first extracted feature from a first data set of a first data source and a second feature set having a second extracted feature from a second data set of a second data source; determining, via a computing device processor, if the first extracted feature of the first feature set matches the second extracted feature of the second feature set; and aggregating, via a computing device processor, the first feature set with the second feature set if the first extracted feature of the first feature set matches the second extracted feature of the second feature set.

In further embodiments, a computer implemented method for disparate data source aggregation may include the steps of: extracting feature data from a data set of one or more data sources; automatically correlating and augmenting the extracted features against the disparate data sets or feature sets for individuals without the need for a unique identifier for each individual to compare the extracted features against the disparate data sets; creating and aggregating profile records with the feature data into a system database; automatically self-adjusting the aggregated profile records of the system database; providing aggregated data from the system database to other systems; and providing a self-adjusting application program interface for searching, querying, and modeling insights of the data in the system database.

According to another embodiment consistent with the principles of the invention, a computer implemented method for creating and aggregating profile records is provided. In some embodiments, the method may include the steps of: receiving extracted feature sets from a data set of one or more data sources; determining feature sets that substantial match one or more feature sets from disparate data sets; creating profile records from feature set and any substantially matching feature sets; and storing profile records in system database.

According to yet another embodiment consistent with the principles of the invention, a computer implemented method for managing a self-adjust aggregated system database is provided. In some embodiments, the method may include the steps of: obtaining one or more data sets; extracting feature sets from the data sets; determining feature sets that substantial match feature sets from a system database; and updating feature sets of system database with features from substantially matching feature sets.

According to still another embodiment consistent with the principles of the invention, a computer implemented method of providing a self-adjusting application program interface is provided. In some embodiments, the method may include the steps of: receiving, via a computing device processor, a first query from a first programmable interface; searching, via a computing device processor, a system database for data that satisfies the first query; and outputting data, via a computing device processor, via the first programmable interface data that satisfies the first query. For example, the method of providing a self-adjusting application program interface may receive a query that may be constructed to find features of an aggregated profile that span disparate data sources, such that the query may be used to retrieve aggregated profiles for user having a skill X in a first data source and having a performance rating of 4 in a second data source in an aggregated profile record of the system.

In further embodiments, a computer implemented method of providing a self-adjusting application program interface the system database may include data obtained by a computer implemented method for disparate data source aggregation, the method including the steps of: extracting, via a computing device processor, a first feature set having a first extracted feature from a first data set of a first data source and a second feature set having a second extracted feature from a second data set of a second data source; determining, via a computing device processor, if the first extracted feature of the first feature set matches the second extracted feature of the second feature set; and aggregating, via a computing device processor, the first feature set with the second feature set if the first extracted feature of the first feature set matches the second extracted feature of the second feature set.

BRIEF DESCRIPTION OF THE DRAWINGS

Some embodiments of the present invention are illustrated as an example and are not limited by the figures of the accompanying drawings, in which like references may indicate similar elements and in which:

FIG. 9 shows a block diagram of an example of an aggregated profile record which may contain a number of aggregated data fields or aggregated features according to various embodiments described herein.

DETAILED DESCRIPTION OF THE INVENTION

Figure 1:
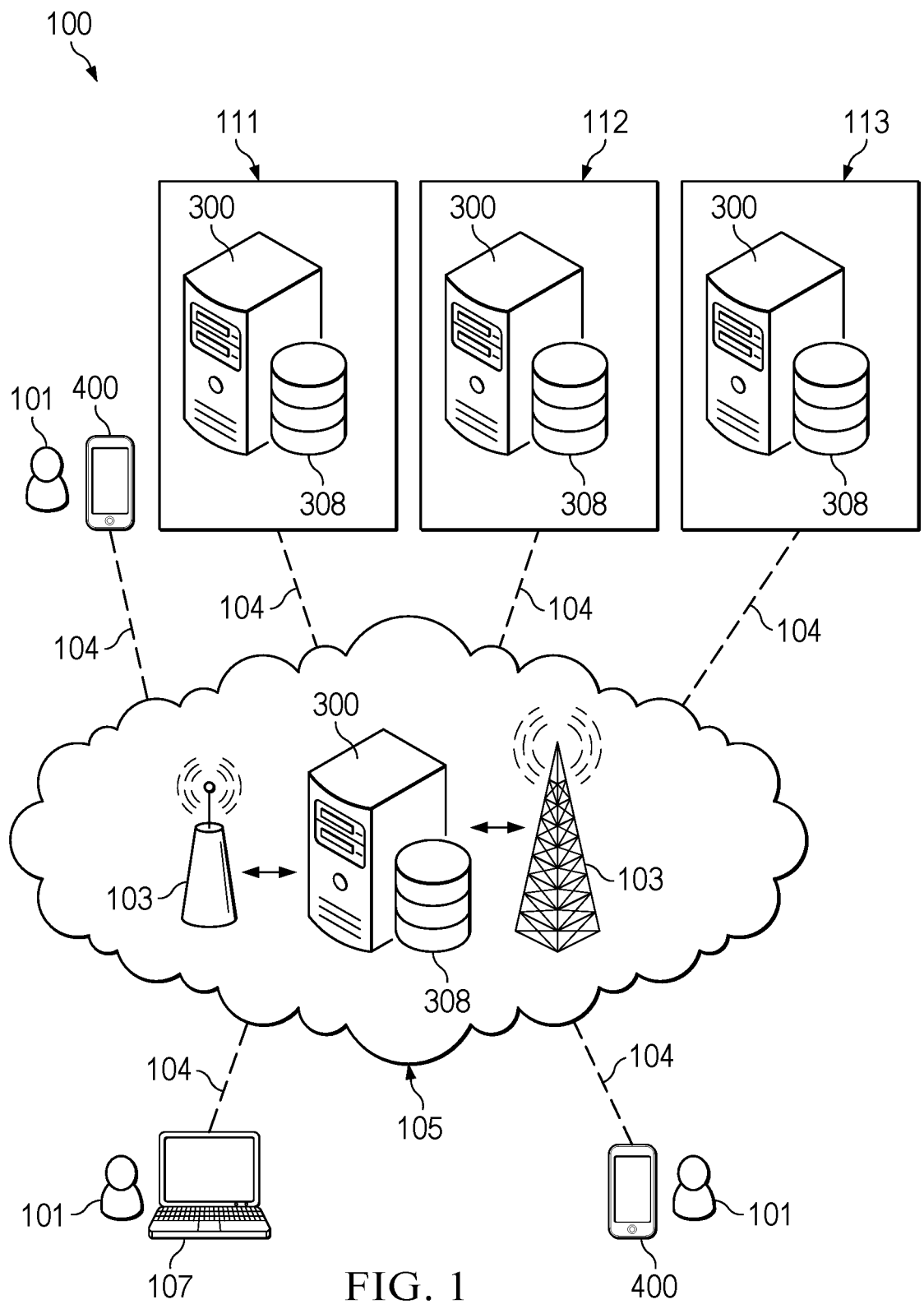
FIG. 1 depicts an illustrative example of some of the components and computer implemented methods which may be found in a disparate data source aggregation system according to various embodiments described herein.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

Definitions

As used herein, the term "computer" refers to a machine, apparatus, or device that is capable of accepting and performing logic operations from software code. The term "application", "software", "software code" or "computer software" refers to any set of instructions operable to cause a computer to perform an operation. Software code may be operated on by a "rules engine" or processor. Thus, the methods and systems of the present invention may be performed by a computer based on instructions received by computer software.

The term "client device" or sometimes "electronic device" or just "device" as used herein is a type of computer generally operated by a person or user of the system. In some embodiments, a client device is a smartphone or computer configured to receive and transmit data to a server or other electronic device which may be operated locally or in the cloud. Non-limiting examples of client devices include: personal computers (PCs), workstations, laptops, tablet PCs including the iPad, cell phones including iOS phones made by Apple Inc., Android OS phones, Microsoft OS phones, Blackberry phones, or generally any electronic device capable of running computer software and displaying information to a user. Certain types of client devices which are portable and easily carried by a person from one location to another may sometimes be referred to as a "mobile device" or "portable device". Some non-limiting examples of mobile devices include: cell phones, smartphones, tablet computers, laptop computers, wearable computers such as Apple Watch, other smartwatches, Fitbit, other wearable fitness trackers, Google Glasses, and the like.

The term "computer readable medium" as used herein refers to any medium that participates in providing instructions to the processor for execution. A computer readable medium may take many forms, including but not limited to, non-volatile media, volatile media, and transmission media. Non-volatile media includes, for example, optical, magnetic disks, and magneto-optical disks, such as the hard disk or the removable media drive. Volatile media includes dynamic memory, such as the main memory. Transmission media includes coaxial cables, copper wire and fiber optics, including the wires that make up the bus. Transmission media may also take the form of acoustic or light waves, such as those generated during radio wave and infrared data communications.

As used herein the term "data network" or "network" shall mean an infrastructure capable of connecting two or more computers such as client devices either using wires or wirelessly allowing them to transmit and receive data. Non-limiting examples of data networks may include the internet or wireless networks or (i.e. a "wireless network") which may include Wifi and cellular networks. For example, a network may include a local area network (LAN), a wide area network (WAN) (e.g., the Internet), a mobile relay network, a metropolitan area network (MAN), an ad hoc network, a telephone network (e.g., a Public Switched Telephone Network (PSTN)), a cellular network, or a voice-over-IP (VoIP) network.

As used herein, the term "database" shall generally mean a digital collection of data or information. The present invention uses novel methods and processes to store, link, and modify information such digital images and videos and user profile information. For the purposes of the present disclosure, a database may be stored on a remote server and accessed by a client device through the internet (i.e., the database is in the cloud) or alternatively in some embodiments the database may be stored on the client device or remote computer itself (i.e., local storage). A "data store" as used herein may contain or comprise a database (i.e. information and data from a database may be recorded into a medium on a data store).

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

New systems and methods for enabling data processing and data management by aggregating data from disparate data sources are discussed herein. In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

The present invention will now be described by example and through referencing the appended figures representing preferred and alternative embodiments. As perhaps best shown by FIG. 1, an illustrative example of some of the physical components which may comprise a disparate data source aggregation system ("the system") 100 according to some embodiments is presented. The system 100 is configured to facilitate the transfer of data and information between one or more access points 103, client devices 400, and servers 300 over a data network 105. A data store 308 accessible by the server 300 may contain one or more databases. Each user device 400 may send data to and receive data from the data network 105 through a network connection 104 with an access point 103. The data may comprise any information that one or more users 101 or individuals desire to input into the system 100 including information describing one or more users 101 or individuals, information describing the actions of one or more users 101 or individuals, information requested by one or more users 101 or individuals, information supplied by one or more users 101 or individuals, and any other information which a user 101 or individual may desire to input or enter into the system 100.

In this example, the system 100 comprises at least one client device 400 (but preferably more than two client devices 400) configured to be operated by one or more users 101. Client devices 400 can be mobile devices, such as laptops, tablet computers, personal digital assistants, smart phones, and the like, that are equipped with a wireless network interface capable of sending data to one or more servers 300 with access to one or more data stores 308 over a network 105 such as a wireless local area network (WLAN). Additionally, client devices 400 can be fixed devices, such as desktops, workstations, and the like, that are equipped with a wireless or wired network interface capable of sending data to one or more servers 300 with access to one or more data stores 308 over a wireless or wired local area network 105. The present invention may be implemented on at least one client device 400 and/or server 300 programmed to perform one or more of the steps described herein. In some embodiments, more than one client device 400 and/or server 300 may be used, with each being programmed to carry out one or more steps of a method or process described herein.

The system 100 is configured to automatically aggregate talent data from one or more data sources 111, 112, 113. In preferred embodiments, the system 100 is configured to automatically aggregate talent data from two or more disparate data sources 111, 112, 113. The talent data may be aggregated into a system database 330. Users 101 may search, query, and model insights into the data of the system database 330.

Data sources 111, 112, 113, may comprise talent systems, such as LinkedIn, Indeed, and internal talent data systems, such as those managed by Taleo or Kenexa, which store and maintain data describing various individuals, typically in a job-seeking or employment history or skills context. Data stored and maintained by a data source 111, 112, 113, may be stored in a data store 308 accessible by one or more servers 300. Most individuals who use a data source 111, 112, 113, are members of more than one data source 111, 112, 113. Each data source 111, 112, 113, may comprise a profile for each individual that is a member of the data source 111, 112, 113, however, some individuals may have more than one profile on one or more data sources 111, 112, 113. Each profile for an individual may contain a number of features or data fields which may describe that individual. Example features may include the name of the individual; the current employer of the individual; a previous employer of the individual; the current job title of the individual; previous job title of the individual; and/or any other information which may describe the individual. Data sources 111, 112, 113, that organize their data in a unique or proprietary manner may be referred to as disparate data sources 111, 112, 113, in so much as they may have different features, different names for features, different data sorted in their features, or any other types of disparate data. The system 100 is able to aggregate or collect talent data from disparate data sources 111, 112, 113, into a system database 330 and to allow users 101 to search, query, and model insights into the data of the system database 330.

Figure 2:
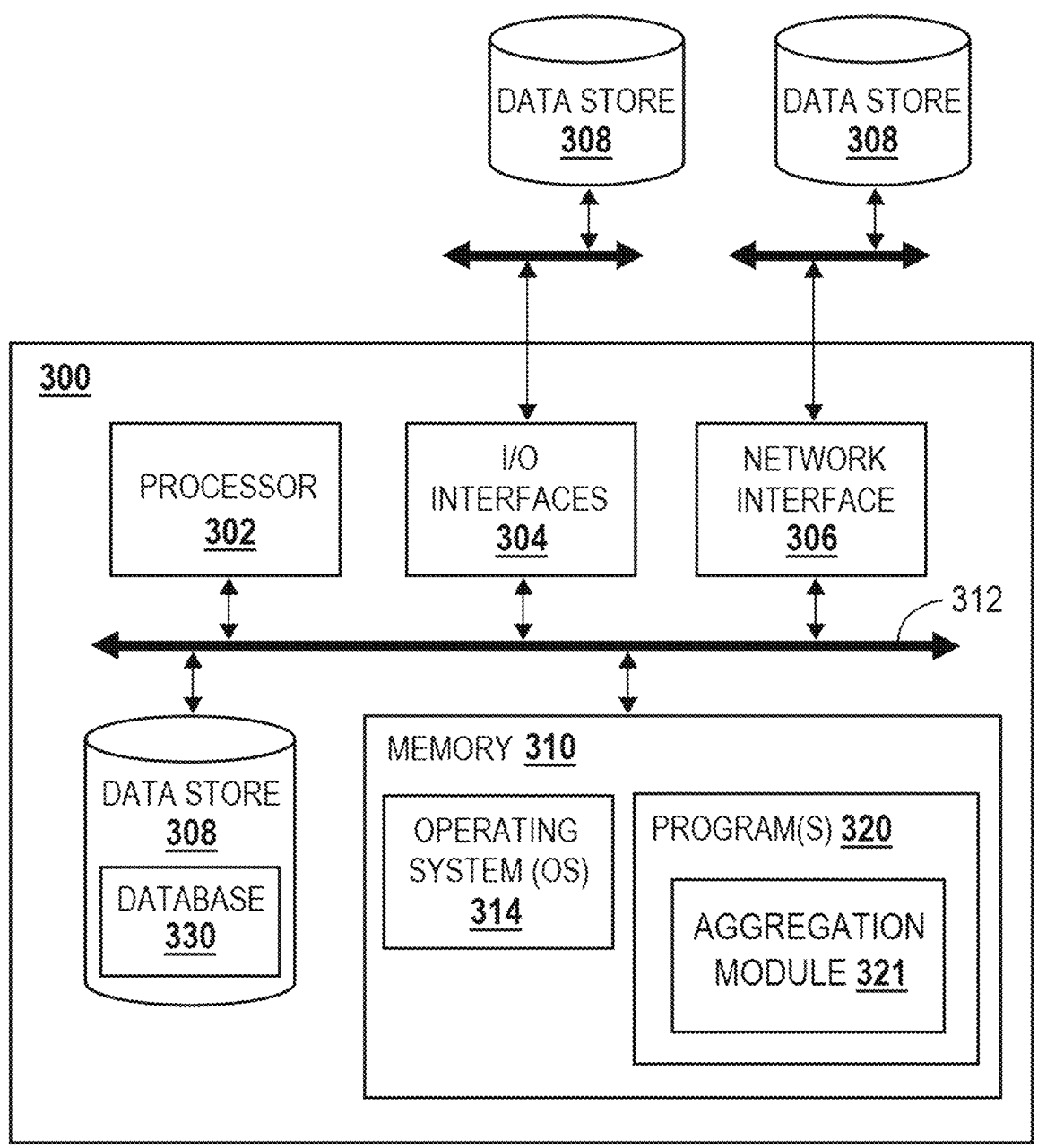
FIG. 2 illustrates a block diagram showing an example of a server which may be used by the system as described in various embodiments herein.

Referring now to FIG. 2, in an exemplary embodiment, a block diagram illustrates a server 300 of which one or more may be used in the system 100 or standalone. The server 300 may be a digital computer that, in terms of hardware architecture, generally includes a processor 302, input/output (I/O) interfaces 304, a network interface 306, a data store 308, and memory 310. It should be appreciated by those of ordinary skill in the art that FIG. 2 depicts the server 300 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 may be, for example but not limited to, one or more buses or other wired or wireless connections, as is known in the art. The local interface 312 may have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 may be any custom made or commercially available processor, a central processing unit (CPU), an auxiliary processor among several processors associated with the server 300, a semiconductor-based microprocessor (in the form of a microchip or chip set), or generally any device for executing software instructions. When the server 300 is in operation, the processor 302 is configured to execute software stored within the memory 310, to communicate data to and from the memory 310, and to generally control operations of the server 300 pursuant to the software instructions. The I/O interfaces 304 may be used to receive user input from and/or for providing system output to one or more devices or components. User input may be provided via, for example, a keyboard, touch pad, and/or a mouse. System output may be provided via a display device and a printer (not shown). I/O interfaces 304 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 306 may be used to enable the server 300 to communicate on a network, such as the Internet, the data network 105, the enterprise, and the like, etc. The network interface 306 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). The network interface 306 may include address, control, and/or data connections to enable appropriate communications on the network. A data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media. In one example, the data store 308 may be located internal to the server 300 such as, for example, an internal hard drive connected to the local interface 312 in the server 300. Additionally in another embodiment, the data store 308 may be located external to the server 300 such as, for example, an external hard drive connected to the I/O interfaces 304 (e.g., SCSI or USB connection). In a further embodiment, the data store 308 may be connected to the server 300 through a network 105, such as, for example, a network attached file server. Preferably, the system 100 may comprise a system database 330 which may be stored in one or more data stores 308.

The memory 310 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 may include one or more software programs, each of which includes an ordered listing of executable instructions for implementing logical functions. The software in the memory 310 may include a suitable operating system (O/S) 314 and one or more programs 320.

The operating system 314 essentially controls the execution of other computer programs, such as the one or more programs 320, and provides scheduling, input-output control, file and data management, memory management, and communication control and related services. The operating system 314 may be, for example Windows NT, Windows 2000, Windows XP, Windows Vista, Windows 7, Windows 8, Windows 10, Windows Server 2003/2008 (all available from Microsoft, Corp. of Redmond, Wash.), Solaris (available from Sun Microsystems, Inc. of Palo Alto, Calif.), LINUX (or another UNIX variant) (available from Red Hat of Raleigh, N.C. and various other vendors), Android and variants thereof (available from Google, Inc. of Mountain View, Calif.), Apple OS X and variants thereof (available from Apple, Inc. of Cupertino, Calif.), or the like. The one or more programs 320 may be configured to implement the various processes, algorithms, methods, techniques, etc. described herein.

Figure 3:
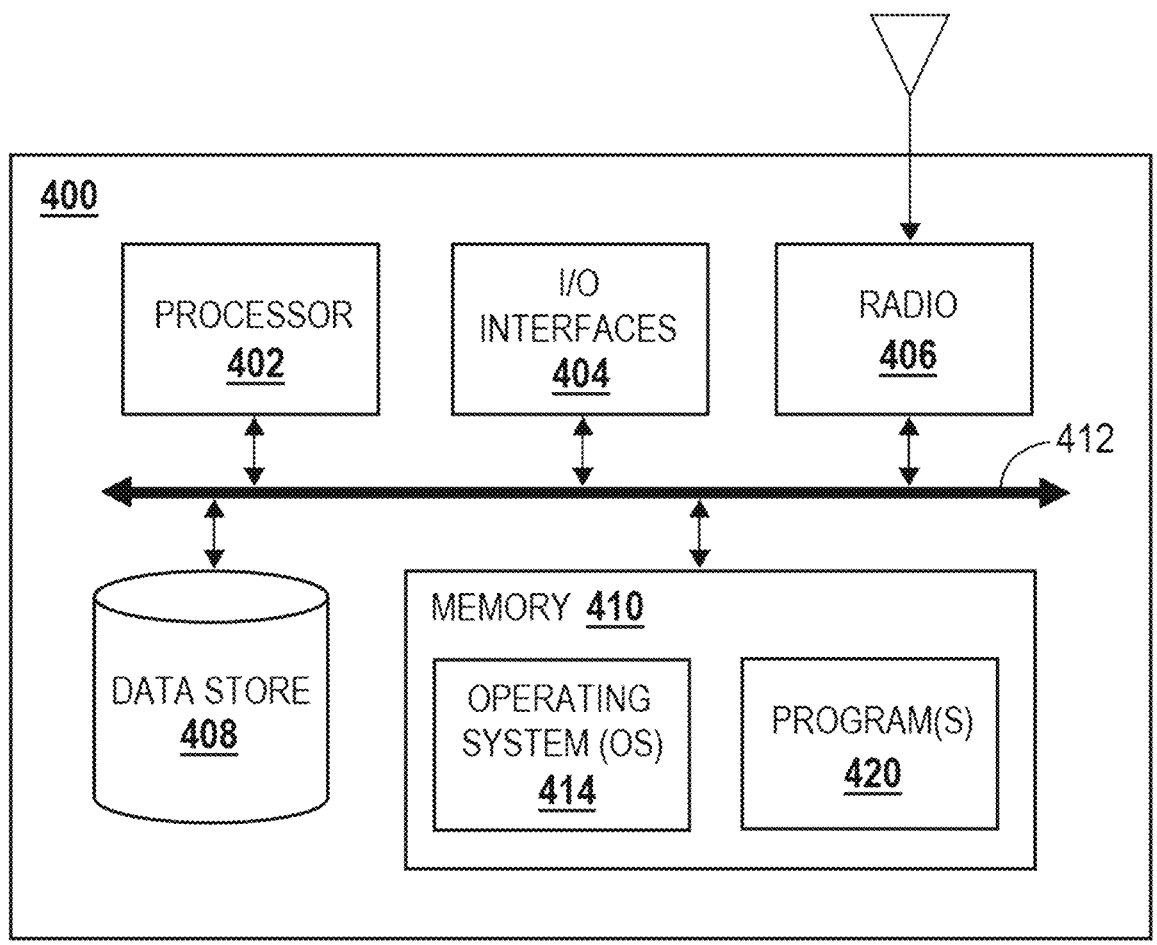
FIG. 3 shows a block diagram illustrating an example of a client device which may be used by the system as described in various embodiments herein.

Referring to FIG. 3, in an exemplary embodiment, a block diagram illustrates a client device 400 of which one or more may be used in the system 100 or the like. The client device 400 can be a digital device that, in terms of hardware architecture, generally includes a processor 402, input/output (I/O) interfaces 404, a radio 406, a data store 408, and memory 410. It should be appreciated by those of ordinary skill in the art that FIG. 3 depicts the client device 400 in an oversimplified manner, and a practical embodiment may include additional components and suitably configured processing logic to support known or conventional operating features that are not described in detail herein. The components (402, 404, 406, 408, and 410) are communicatively coupled via a local interface 412. The local interface 412 can be, for example but not limited to, one or more buses or other wired or wireless connections, as is known in the art. The local interface 412 can have additional elements, which are omitted for simplicity, such as controllers, buffers (caches), drivers, repeaters, and receivers, among many others, to enable communications. Further, the local interface 412 may include address, control, and/or data connections to enable appropriate communications among the aforementioned components.

The processor 402 is a hardware device for executing software instructions. The processor 402 can be any custom made or commercially available processor, a central processing unit (CPU), an auxiliary processor among several processors associated with the client device 400, a semiconductor-based microprocessor (in the form of a microchip or chip set), or generally any device for executing software instructions. When the client device 400 is in operation, the processor 402 is configured to execute software stored within the memory 410, to communicate data to and from the memory 410, and to generally control operations of the client device 400 pursuant to the software instructions. In an exemplary embodiment, the processor 402 may include a mobile optimized processor such as optimized for power consumption and mobile applications.

The I/O interfaces 404 can be used to receive data and user input and/or for providing system output. User input can be provided via a plurality of I/O interfaces 404, such as a keypad, a touch screen, a camera, a microphone, a scroll ball, a scroll bar, buttons, bar code scanner, voice recognition, eye gesture, and the like. System output can be provided via a display device such as a liquid crystal display (LCD), touch screen, and the like. The I/O interfaces 404 can also include, for example, a serial port, a parallel port, a small computer system interface (SCSI), an infrared (IR) interface, a radio frequency (RF) interface, a universal serial bus (USB) interface, and the like. The I/O interfaces 404 can include a graphical user interface (GUI) that enables a user to interact with the client device 400. Additionally, the I/O interfaces 404 may be used to output notifications to a user and can include a speaker or other sound emitting device configured to emit audio notifications, a vibrational device configured to vibrate, shake, or produce any other series of rapid and repeated movements to produce haptic notifications, and/or a light emitting diode (LED) or other light emitting element which may be configured to illuminate to provide a visual notification.

The radio 406 enables wireless communication to an external access device or network. Any number of suitable wireless data communication protocols, techniques, or methodologies can be supported by the radio 406, including, without limitation: RF; IrDA (infrared); Bluetooth; ZigBee (and other variants of the IEEE 802.15 protocol); IEEE 802.11 (any variation); Z-Wave wireless communications protocol used primarily for home automation; IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication. The data store 408 may be used to store data. The data store 408 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 408 may incorporate electronic, magnetic, optical, and/or other types of storage media.

The memory 410 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 410 may incorporate electronic, magnetic, optical, and/or other types of storage media. Note that the memory 410 may have a distributed architecture, where various components are situated remotely from one another, but can be accessed by the processor 402. The software in memory 410 can include one or more software programs, each of which includes an ordered listing of executable instructions for implementing logical functions. In the example of FIG. 3, the software in the memory system 410 includes a suitable operating system (O/S) 414 and programs 420.

The operating system 414 essentially controls the execution of other computer programs, and provides scheduling, input-output control, file and data management, memory management, and communication control and related services. The operating system 414 may be, for example, LINUX (or another UNIX variant), Android (available from Google), Symbian OS, Microsoft Windows CE, Microsoft Windows 7 Mobile, iOS (available from Apple, Inc.), webOS (available from Hewlett Packard), Blackberry OS (Available from Research in Motion), and the like. The programs 420 may include various applications, add-ons, etc. configured to provide end user functionality with the client device 400. For example, exemplary programs 420 may include, but not limited to, a web browser, social networking applications, streaming media applications, games, mapping and location applications, electronic mail applications, financial applications, and the like. In a typical example, the end user typically uses one or more of the programs 420 along with a network 105 to exchange information with the system 100.

In some embodiments, the system 100 may comprise an aggregation module 321 which may be a program 320 run by a server 300 and/or be a program 420 run by a client device 400. An aggregation module 321 may be comprise logic operations and software rules engines, such as an extraction engine 322, aggregation engine 323, database engine 324, and/or an API engine 325, which may enable the system 100 to input, output, and manipulate data of a system database 330, data of any number of data sources 111, 112, 113, or any other data accessible by the system 100.

Figure 4:
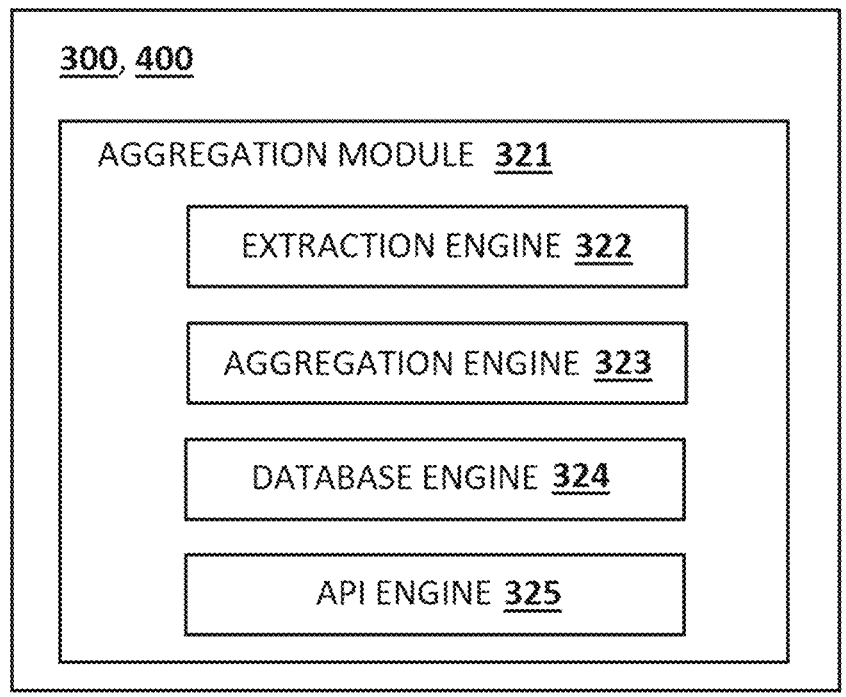
FIG. 4 depicts a block diagram illustrating some applications of an aggregation module which may function as software rules engines according to various embodiments described herein.

FIG. 4 depicts a block diagram illustrating some applications of an aggregation module 321 which may function as software rules engines according to various embodiments described herein. In preferred embodiments, an aggregation module 321 may include an extraction engine 322, an aggregation engine 323, a database engine 324, and an application programming interface (API) engine 325. The aggregation module 321 and/or one or more of the engines 322, 323, 324, 325, may optionally be configured to run on a server 300 and/or a client device 400 which may be in communication with a system database 330 according to various embodiments described. It should be understood that the functions attributed to the engines 322, 323, 324, 325, described herein are exemplary in nature, and that in alternative embodiments, any function attributed to any engine 322, 323, 324, 325, may be performed by one or more other engines 322, 323, 324, 325, or any other suitable processor logic.

Generally, the system database 330 having one or more, such as a first feature set 120A, a second feature set 120B, and a third feature set 120C, and preferably a plurality of feature sets 120, may be maintained, searched, and otherwise manipulated by the database engine 324 of the aggregation module 321. In some embodiments, the extraction engine 322 may comprise or function as extraction logic stored in the memory 310, 410 which may be executable by the processor 302, 402, of a server 300 and/or client device 400. In further embodiments, the extraction engine 322 may be configured to extract data from the data sets 115, 116, 117, of one or more data sources 111, 112, 113, and to create one or more feature sets 120A, 120B, 120C, having one or more features for an individual.

In some embodiments, the aggregation engine 323 may comprise or function as aggregation logic stored in the memory 310, 410 which may be executable by the processor 302, 402, of a server 300 and/or client device 400. In further embodiments, the aggregation engine 323 may be configured to determine if one or more extracted features 121-131 of a feature set 120 matches one or more extracted features 121-131 of another second feature set 120. If one or more extracted features of the feature sets 120 match, the aggregation engine 323 may be configured to aggregate or combine the feature sets 120 preferably by storing the aggregated feature sets 120 in an aggregated profile record 150 in the system database 330.

In some embodiments, the database engine 324 may comprise or function as database logic stored in the memory 310, 410 which may be executable by the processor 302, 402, of a server 300 and/or client device 400. In further embodiments, a database engine 324, optionally under the direction of an aggregation engine 323, may be configured to send, receive, access, modify, and otherwise manipulate data in the system database 330 of a data store 308.

In some embodiments, the API engine 325 may comprise or function as interface logic stored in the memory 310, 410 which may be executable by the processor 302, 402, of a server 300 and/or client device 400. In further embodiments, an API engine 325 may be configured to receive a query from a programmable interface; search the system database 330 for data that satisfies the query; and output, via the respective programmable interface data that satisfies the query.

Figure 5:
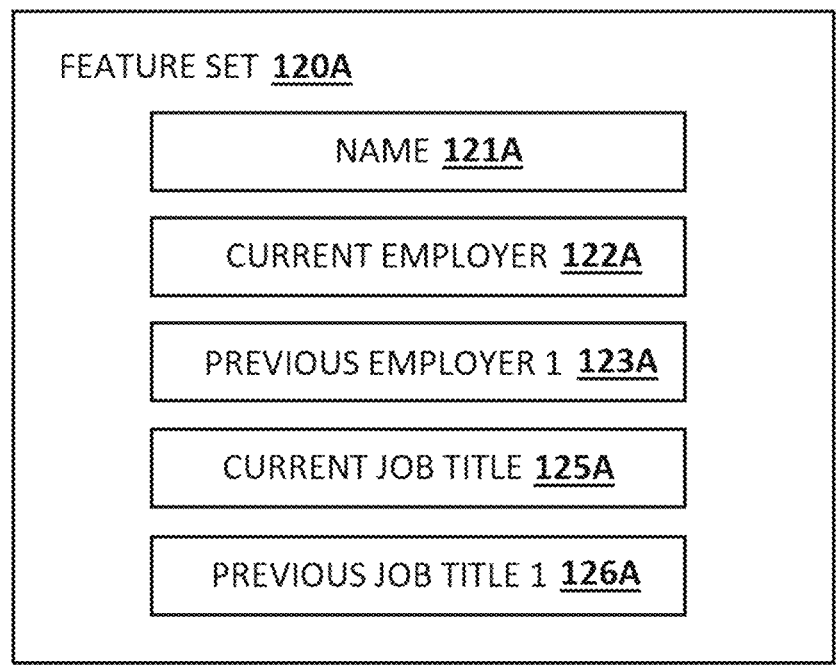
FIG. 5 illustrates a block diagram of an example of a first feature set which may contain a number of extracted data fields or extracted features according to various embodiments described herein.
Figure 6:
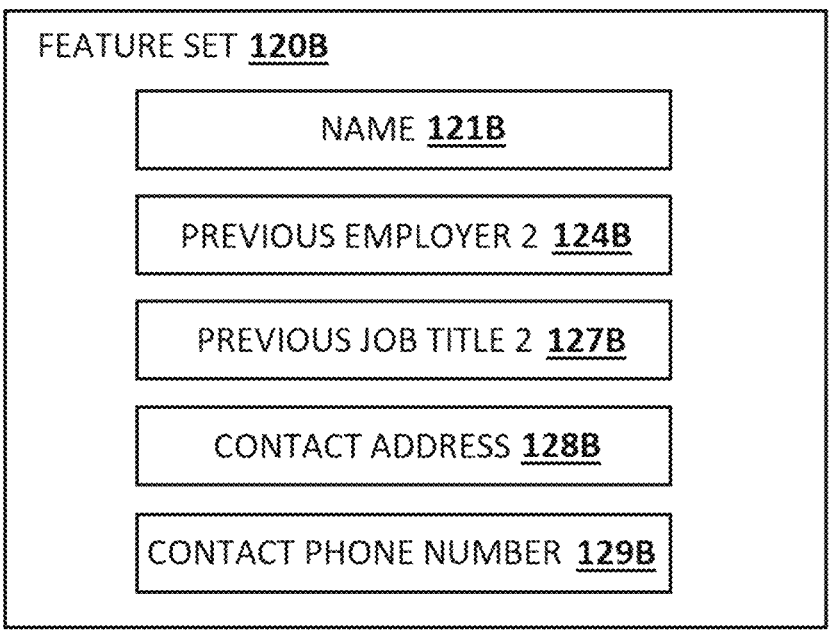
FIG. 6 shows a block diagram of an example of a second feature set which may contain a number of extracted data fields or extracted features according to various embodiments described herein.
Figure 7:
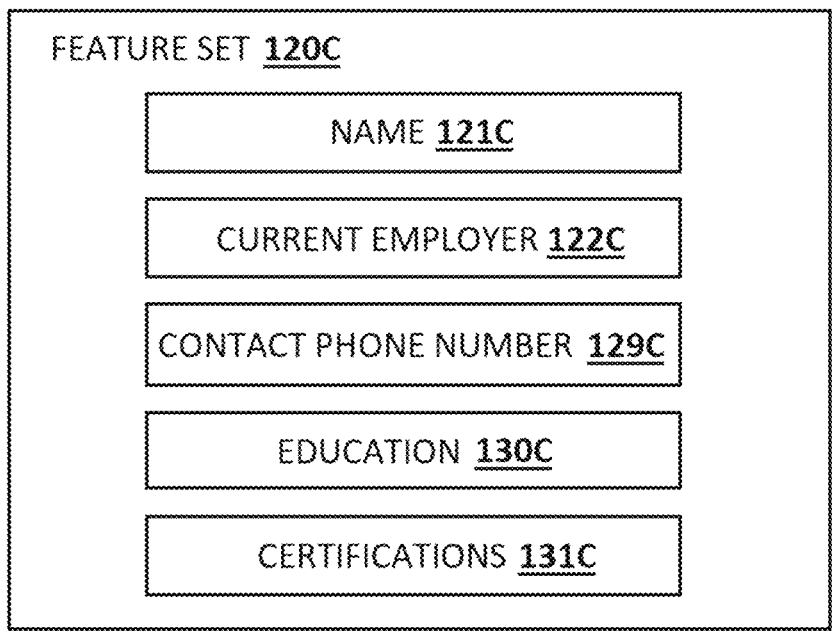
FIG. 7 depicts a block diagram of an example of a third feature set which may contain a number of extracted data fields or extracted features according to various embodiments described herein.
Figure 8:
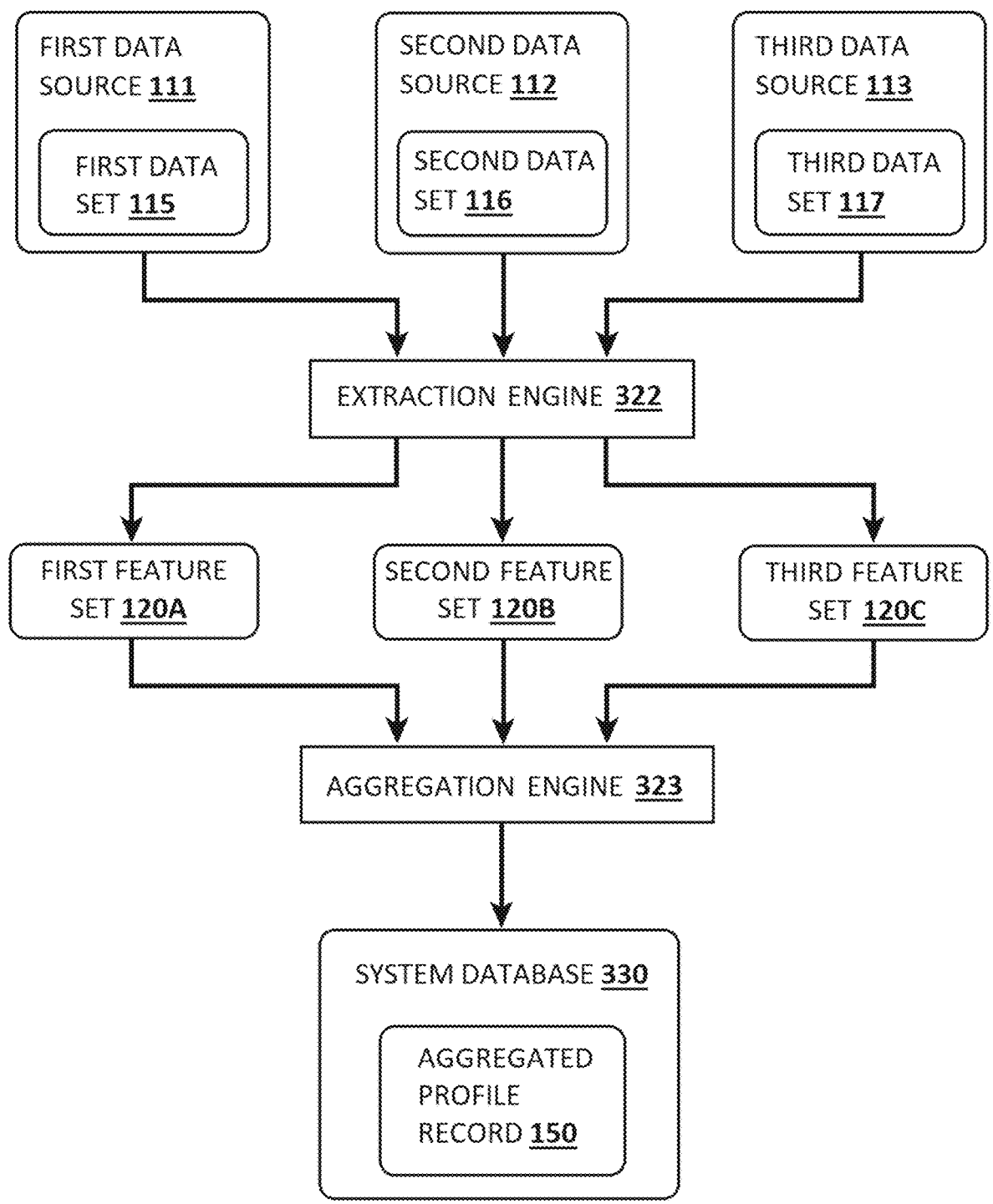
FIG. 8 illustrates a flow diagram depicting how engines of the aggregation module may generate an aggregated profile record according to various embodiments described herein.

FIGS. 5-7 depict a block diagrams showing examples of feature sets 120A, 120B, 120C, which may contain a number of extracted data fields or extracted features 121A-131C. A feature set 120A, 120B, 120C, may be created by an extraction engine 322 by extracting talent data from a data set 115, 116, 117, or database of a data source 111, 112, 113. Talent data may describe the data in a feature set 120 or an aggregated profile record 150 of the system database 330 or the data in a data set 115, 116, 117, of a data source 111, 112, 113, of an individual. Generally, a data set 115, 116, 117, may be likened to a profile for an individual with each feature or data field preferably containing talent data which may describe that individual in the system 100. For example, an extraction engine 322 may extract or retrieve a first feature set 120A from a first data set 115 of a first data source 111. The first data source 111 may comprise LinkedIn, the first data set 115 may comprise one or more data fields or features for a profile attributed to John Smith, and the first feature set 120A may comprise the data and fields of John Smith that were retrieved from LinkedIn by the extraction engine 322. As another example, the extraction engine 322 may create a first feature set 120A having one or more first extracted features 121A-131A from a first data set 115 of a first data source 111; a second feature set 120B having one or more second extracted features 121B-131B from a second data set 116 of a second data source 112; and a third feature set 120C having one or more third extracted features 121C-131C from a third data set 117 of a third data source 113. It should be understood, that the extraction engine 322 may create any number of feature sets 120 having one or more extracted features 121-131 from a data set 115 of a any number of data sources.

In the examples shown in FIGS. 5-7, the feature sets 120A, 120B, 120C, for an individual may comprise one or more extracted features, such as a name feature 121, a current employer feature 122, a first previous employer feature 123, a second previous employer feature 124, a current job title feature 125, a first previous job title feature 126, a second previous job title feature 127, a contact address feature 128, a contact phone number feature 129, an education feature 130, and a certifications feature 131. Each feature may contain data for an individual that generally is described by the name of the feature. For example and for an individual with the name of John Smith, data in the name feature 121A, 121B, 121C, may comprise "John Smith", data in the current employer feature 122 may comprise "ABC Company", and data in the current job title feature 125 may comprise "project management leader". However, it should be understood that a feature set 120 is not limited to this information and other feature sets 120 may include any number of features.

FIG. 9 depicts a block diagram showing an example of an aggregated profile record 150 which may contain a number of data fields or features 151-161. An aggregated profile record 150 may generally be likened to a profile for an individual, created and stored by the system 100, with each feature or data field preferably containing data which may describe that individual. All the talent data of an individual, having one or more features that were extracted from a data set 115, 116, 117, of a data source 111, 112, 113, by the aggregation module 321 may be stored in an aggregated profile record 150 for that individual in the system database 330 by an aggregation engine 323. Preferably, an aggregation engine 323 may create an aggregated profile record 150 for each individual that the extraction engine 322 generates a feature set 120 for.

In the example shown in FIG. 9, the aggregated profile record 150 for an individual may comprise one or more aggregated features, such as a name feature 151, a current employer feature 152, a first previous employer feature 153, a second previous employer feature 154, a current job title feature 155, a first previous job title feature 156, a second previous job title feature 157, a contact address feature 158, a contact phone number feature 159, an education feature 160, and a certifications feature 161. Each feature may contain data for an individual that generally is described by the name of the feature. For example and for an individual with the name of John Smith, data in the name feature 151 may comprise "John Smith", data in the current employer feature 152 may comprise "ABC Company", and data in the current job title feature 155 may comprise "project management leader". However, it should be understood that an aggregated profile record 150 is not limited to this information and other aggregated profile records 150 may include any number of aggregated features.

Figure 10:
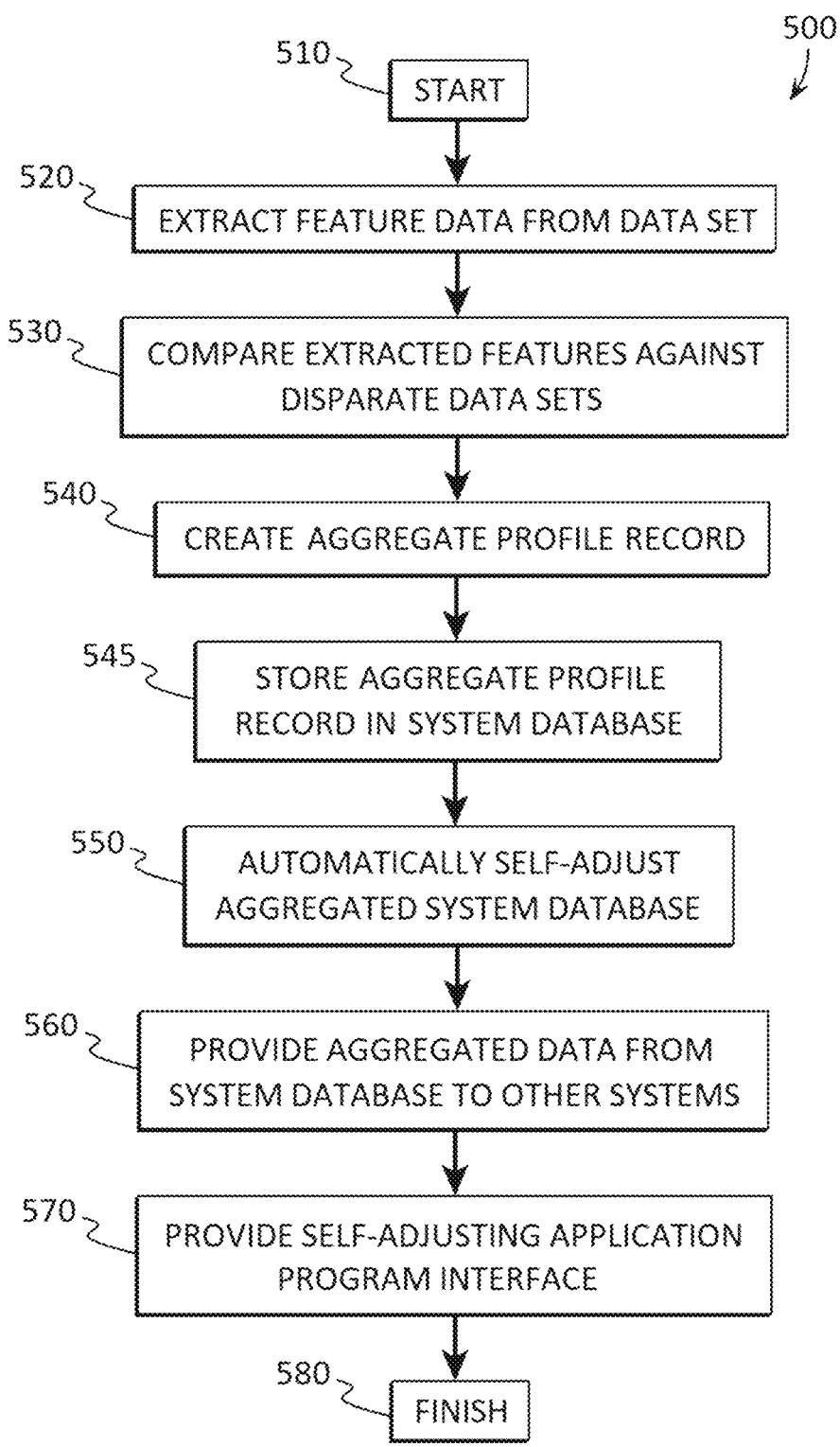
FIG. 10 depicts a block diagram of an example of a method for disparate data source aggregation according to various embodiments described herein.

FIG. 10 illustrates a block diagram of an example of a computer implemented method for disparate data source aggregation ("the method") 500 according to various embodiments described herein. The method 500 may be performed by one or more engines 322, 323, 324, 325, of an aggregation module 321 to pull or retrieve talent data from disparate data sources 111, 112, 113, automatically correlate the data across the different data sources 111, 112, 113, build a self-adjusting system database 330 that captures the talent data from the disparate data sources 111, 112, 113, and lets users 101 search, query and build model insights on the aggregated data of the system database 330 without human intervention.

In some embodiments, the method 500 may start 510 and the extraction engine 322 may extract feature data from one or more data sets 115, 116, 117 of one or more data sources 111, 112, 113 in step 520 into one or more feature sets 120A, 120B, 120C. The feature data or talent data coming from data sources 111, 112, 113, could be structured feed or unstructured feeds. Structured feeds typically are CSV, Excel, Text, XML, JSON, etc., and unstructured feeds typically are a resume, document, image, html, blogs, web page, etc. For unstructured data, the extraction engine 322 may run natural language processing to extract features in a document. Example features may include: name, location, skills, certifications, work experience, education, certifications and languages.

Figure 11:
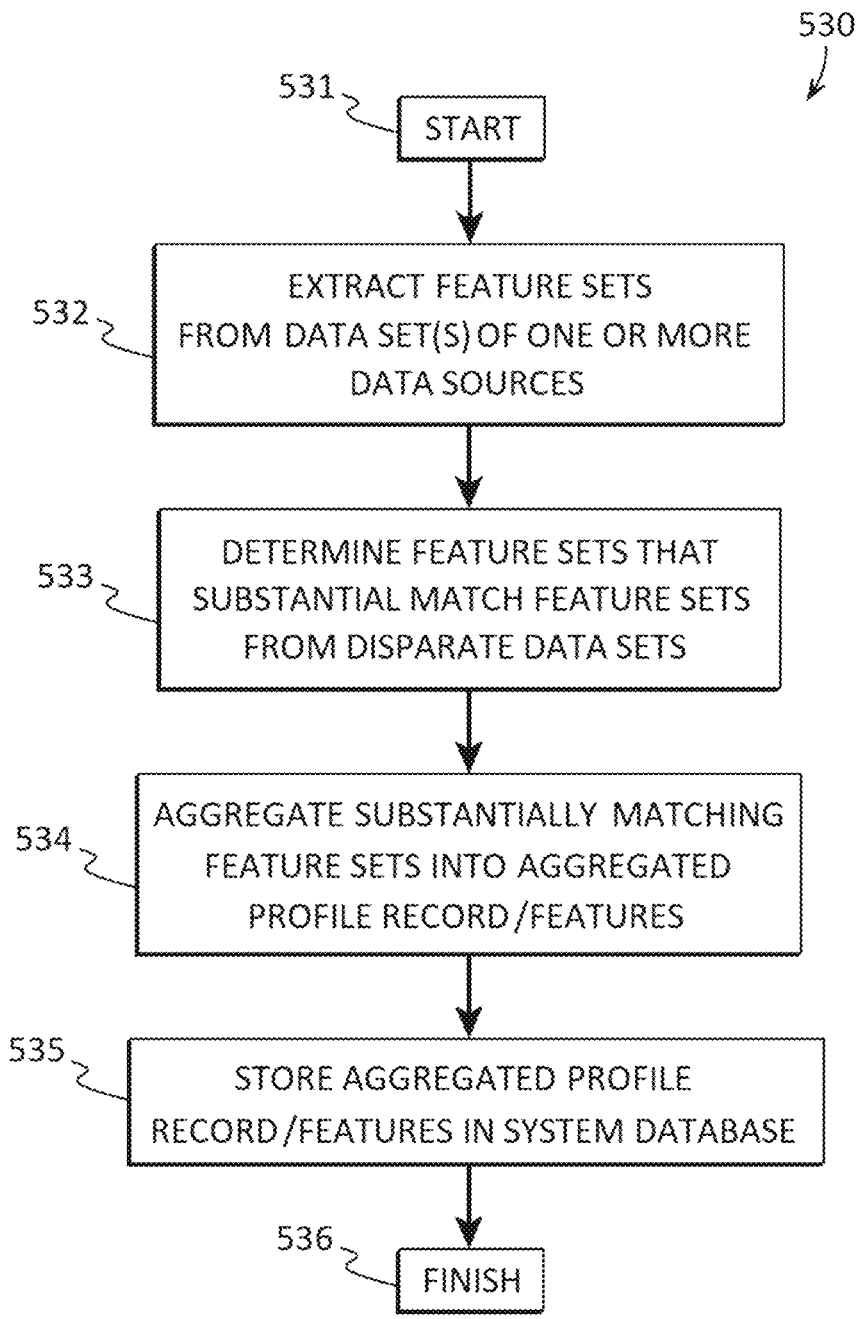
FIG. 11 illustrates a block diagram of an example of a method for creating and aggregating profile records according to various embodiments described herein.

In step 530, the aggregation engine 323 may compare extracted features 121-131 against disparate data sets (such as the extracted features 121-131 of one or more other feature sets 120A, 120B, 120C) as discussed further in FIG. 11. In some embodiments, step 530 may be accomplished by comparing a set of extracted features 121-131 of a first feature set 120A from a first data set 115 of a first data source 111 to the set of extracted features 121-131 of a second feature set 120B from a second data set 116 of a second data source 112 and to the set of extracted features 121-131 of a third feature set 120C from a third data set 117 of a third data source 113 (or any number of data sources 111, 112, 113).

In step 540, the aggregation engine 323 may aggregate the extracted features 121-131 of one, but preferably two or more, feature sets 120A, 120B, 120C, of an individual into an aggregated profile record 150 for that individual. In some embodiments, the aggregation engine 323 may create an aggregated profile record 150 for an individual by aggregating the matching extracted feature sets 120A, 120B, 120C, (feature sets 120A, 120B, 120C, having one or more extracted features 121-131 that match one or more extracted features 121-131 of one or more other feature sets 120A, 120B, 120C) of that individual obtained in step 503 from one or more data sources 111, 112, 113. In some embodiments, the aggregation engine 323 may generate or create an aggregated profile record 150 for each individual so that each individual may have at least one aggregated profile record 150 and each aggregated profile record 150 may comprise the data aggregated from the one or more data sources 111, 112, 113, from step 520.

In step 545, the database engine 324 may store the aggregated profile record 150 into the system database 330. In some embodiments, the aggregated feature data (aggregated profile record 150 and/or aggregated features 151-161) for each individual may be saved in the system database 330 by the database engine 324 so that each individual may have one aggregated profile record 150 and that aggregated profile record 150 may comprise the data aggregated from the one or more data sources 111, 112, 113, from step 520.

In step 550, the aggregation engine 323 may automatically self-adjust the aggregated system database 330. In some embodiments, the aggregation engine 323 may automatically self-adjust the aggregated system database 330 by periodically receiving extracted feature sets 120 for an individual from the extraction engine 322. The aggregation engine 323 may compare the features 121-131 of the feature sets 120 to the features 151-161 of the aggregated profile record 150, preferably retrieved from the system database 330 by the database engine 324, and then aggregate the talent data of the features 121-131 into the features 151-161 of the aggregated profile record 150 for the individual as discussed further in FIG. 12. In this manner, the system 100 may self-adjust or self-update the aggregated profile records 150 of the system using data extracted from the data sets 115, 116, 117, of data sources 111, 112, 113.

In optional step 560, a database engine 324 may provide aggregated data from the system database 330 to one or more third party systems 107. For example, the database engine 324 may periodically provide aggregated data from the system database 330 to a third party system 107, such as one or more websites, talent databases, human resource departments, and the like, which may be enrolled or subscribed to the system 100. In this manner, the one or more websites, talent databases, human resource departments, and the like, which may be enrolled or subscribed to the system 100 may have access to continually updated talent data for individuals having an aggregated profile record 150 in the system database 330.

In step 570, an application program interface (API) engine 325 may provide a self-adjusting application program interface (API). In preferred embodiments, the application program interface (API) engine 325 may provide a self-adjusting API that may be query-able via web services, Structured Query Language (SQL) queries, and 3rd party visualization tools that can support SQL, non SQL or non relational (NOSQL) dialect, or any other programmable interface as discussed further in FIG. 13. The self-adjusting API may enable any number of consumers to search, query, and model insights into the data model of the system database 330 preferably via their respective client device 400. After step 570, the method 500 may finish 580.

FIG. 11 depicts a block diagram of an example of a method for creating and aggregating profile records ("the method") 530 according to various embodiments described herein. The method 530 may be used to extract talent data or feature sets from one or more data sources 111, 112, 113, and to aggregate the data into the system database 330 as a single feature set (aggregated profile record 150) preferably for each individual having one or more profiles in the one or more data sources 111, 112, 113. The method 530 may enable the system 100 to automatically correlate and augment disparate talent datasets or feature sets for individuals without the need for a unique identifier for each individual.

In some embodiments, the method 530 may start 531 and the extraction engine 322 may generate one or more extracted feature sets 120 from one or more, and preferably each, data set 115, 116, 117, of one or more data sources 111, 112, 113, in step 532.

In decision block 533 the aggregation engine 323 may determine if one or more feature sets 120A, 120B, 120C, and/or their extracted features 121-131 substantially match one or more other feature sets 120A, 120B, 120C, and/or their extracted features 121-131 from disparate data sets 115, 116, 117, of disparate data sources 111, 112, 113, without requiring the feature sets 120A, 120B, 120C, to have a unique identifier or to be matched via matching unique identifiers (such as an email address, social security number, etc.). In preferred embodiments, the aggregation engine 323 may determine if one or more feature sets 120A, 120B, 120C, and/or their extracted features 121-131 substantially match one or more other feature sets 120A, 120B, 120C, and/or their extracted features 121-131 without requiring a unique identifier so that the aggregation engine 323 may match the feature sets 120A, 120B, 120C, without requiring an extracted feature 121-131 to be or function as a unique identifier. This is a novel feature to the system 100 and methods of the present invention since current systems and methods are unable to match one or more profiles of an individual if the one or more profiles do not have a unique identifier, such as an email address or social security number, that can be matched between the profiles.

In some embodiments, once the feature sets are extracted across data sources 111, 112, 113, the aggregation engine 323 may compare the feature sets 120A, 120B, 120C, from the data sources 111, 112, 113, to accurately identify the profile of an individual. For example, the aggregation engine 323 may pick feature set 120A, 120B, 120C, from a first data source 111 and compare its features against N number of other feature sets 120A, 120B, 120C, from a second data source 112. Feature sets 120A, 120B, 120C, having a desired number of matching extracted features 121-131 may be determined by the aggregation engine 323 to describe the same individual, thereby eliminating the need for a unique identifier to be used to match the feature sets 120A, 120B, 120C, from the disparate data sources 111, 112, 113. In other embodiments, the aggregation engine 323 may compare machine learning models to accurately identify profiles of an individual from two or more data sources 111, 112, 113. In cases where a profile from a data source 111, 112, 113, matches multiple profiles in another data source 111, 112, 113, the aggregation engine 323 may perform disambiguation checks so inaccurate profiles are not correlated.

If the aggregation engine 323 determines one or more feature sets 120A, 120B, 120C, and/or their extracted features 121-131 substantially match one or more other feature sets 120A, 120B, 120C, and/or their extracted features 121-131, the method 530 may proceed to step 534. If the aggregation engine 323 determines one or more feature sets 120A, 120B, 120C, and/or their extracted features 121-131 do not match one or more other feature sets 120A, 120B, 120C, and/or their extracted features 121-131, the method 530 may proceed to step 532.

In step 534 the aggregation engine 323 may aggregate the substantially matching feature sets 120 for an individual into one or more aggregated profile records 150 and/or aggregated features 151-161. In preferred embodiments, the aggregation engine 323 may aggregate the substantially matching feature sets 120 for an individual into an aggregated profile record 150. The aggregation engine 323 may aggregate the substantially matching feature sets 120 for an individual by combining data in the extracted features 121-131 from the matching feature sets 120A, 120B, 120C, into the aggregated features 151-161 of an aggregated profile record 150. For example, a current employer feature 152 may comprise data from one or more current employer features 122A, 122C.

In step 534 the database engine 324 may store the aggregated profile record 150 and/or aggregated features 151-161 in the system database 330. Preferably, the aggregation engine 323 and/or the database engine 324 may create an aggregated profile record 150 if the individual does not already have an aggregated profile record 150. If the individual already has an aggregated profile record 150 in the system database 330, the aggregation engine 323 and/or the database engine 324 may update or otherwise combine the aggregated profile record 150 and/or aggregated features 151-161 from step 533 into the existing aggregated profile record 150 and/or aggregated features 151-161. After step 535, the method 530 may finish 536.

Figure 12:
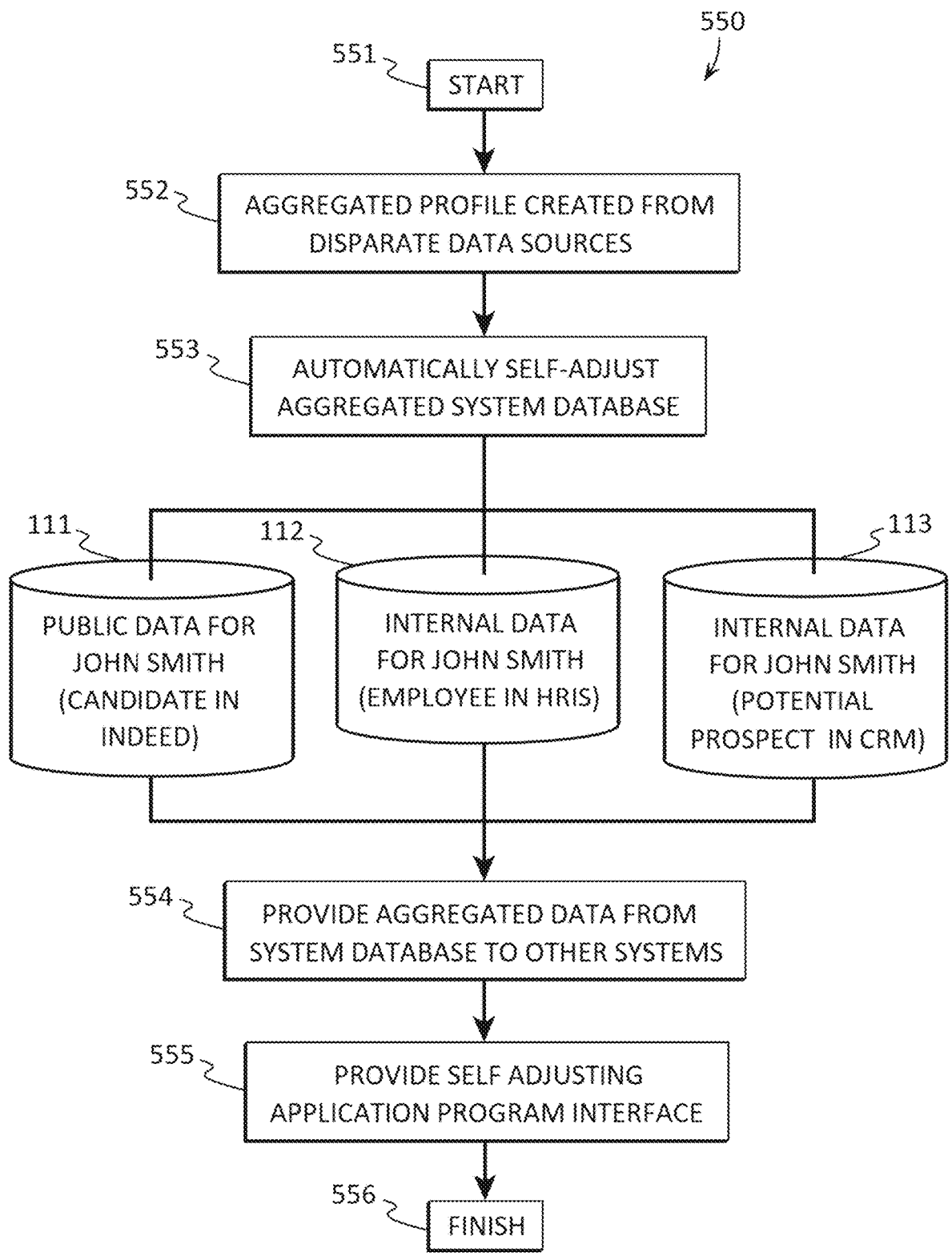
FIG. 12 shows a block diagram of an example of a method for managing a self-adjusting aggregated system database according to various embodiments described herein.

FIG. 12 shows a block diagram of an example of a method for managing a self-adjusting aggregated system database ("the method") 550 according to various embodiments described herein. The method 550 may be used to provide a self-adjusting data model as the system database 330 that shows comprehensive data about an individual extracted from disparate data sources. Preferably, the aggregation module 321 may automatically self-adjust the aggregated system database 330 by periodically extracting, comparing, and aggregating talent data from one or more data sources 111, 112, 113.

In some embodiments, the method 550 may start 551 and the aggregation engine 323 and/or database engine 324 may have created an aggregated profile record 150 for one or more individuals in the system database 330 in step 552 according to method 530 shown in FIG. 11.

Next, the aggregation engine 323 and/or database engine 324 may automatically self-adjust the aggregated system database 330 by adjusting, updating, or otherwise modifying the aggregated features 151-161 of an individual in their aggregated profile record 150 using data from feature sets 120 extracted from one or more data sources 111, 112, 113, in step 553. In preferred embodiments, the extraction engine 322 may periodically extract feature sets 120 from one or more data sources 111, 112, 113, such as every day, twice a week, three times a month, monthly, quarterly, or any other time period. The periodically obtained feature sets 120 may then be provided to the aggregation engine 323 and/or database engine 324 for automatically self-adjusting the aggregated system database 330. Each feature set 120 may comprise one or more extracted features 121-131 for an individual. The extraction engine 322 may extract the feature sets 120 from data set(s) 115, 116, 117, of data sources 111, 112, 113, such as from public data for John Smith (candidate in Indeed), internal data for John Smith (employee in HRIS), and internal data for John Smith (potential prospect in CRM), so that the aggregation engine 323 may access the individual feature sets and the feature data contained therein for each individual. As the aggregation engine 323 aggregates profiles or feature sets from across different data sources 111, 112, 113, optionally the aggregation engine 323 merges the features from the matching profiles or feature sets of the data sources 111, 112, 113, into the single feature set or aggregated profile for each individual. The aggregation engine 323 and/or database engine 324 may update the aggregated profile records 150 of system database 300 with extracted features 121-131 from substantially matching feature sets 120 from the one or more data sources 111, 112, 113. In some embodiments, the aggregation engine 323 and/or database engine 324 may update the aggregated profile record 150 in the system database 300 of an individual with extracted features 121-131 from substantially matching feature sets 120 for that individual that were obtained from the one or more data sources 111, 112, 113. For example, an individual may have a profile having a feature set 120A with data describing the individual as a candidate in a first data source 111 (e.g. applicant tracking system or ATS), the individual may have a profile having feature set 120B data describing the individual as hired and being an employee in a second data source 112 (e.g. human resource information system or HRIS), and the individual may have a profile having feature set 120C data describing the individual as being a potential prospect in a third data source 113 (e.g. Candidate Relationship Management or CRM). In this example, the aggregation engine 323 automatically correlates them and creates a feature set 120 that is self-adjusting via the periodic aggregation of the feature sets from the different or disparate data sources 111, 112, 113. If the individual is also found in another data source 111, 112, 113, the aggregation engine 323 and/or database engine 324 will automatically update the system database 330 so that it is built with the features for that individual from the new data source 111, 112, 113. In some embodiments, the data of the system database 330 could be organized as relational database, JavaScript Object Notation (JSON), XML, Text, CSV, Excel, or any other format.

Next, in step 554 the database engine 324 may provide aggregated data from the system database 330 to third party systems 107. In some embodiments, the database engine 324 may provide aggregated data from the system database 330 to third party systems 107 which may be subscribed to the system 100 or otherwise allowed to access data of the system database 330. In further embodiments, the database engine 324 may provide aggregated data from the system database 330 to third party systems 107 which may request access data of the system database 330.

Figure 13:
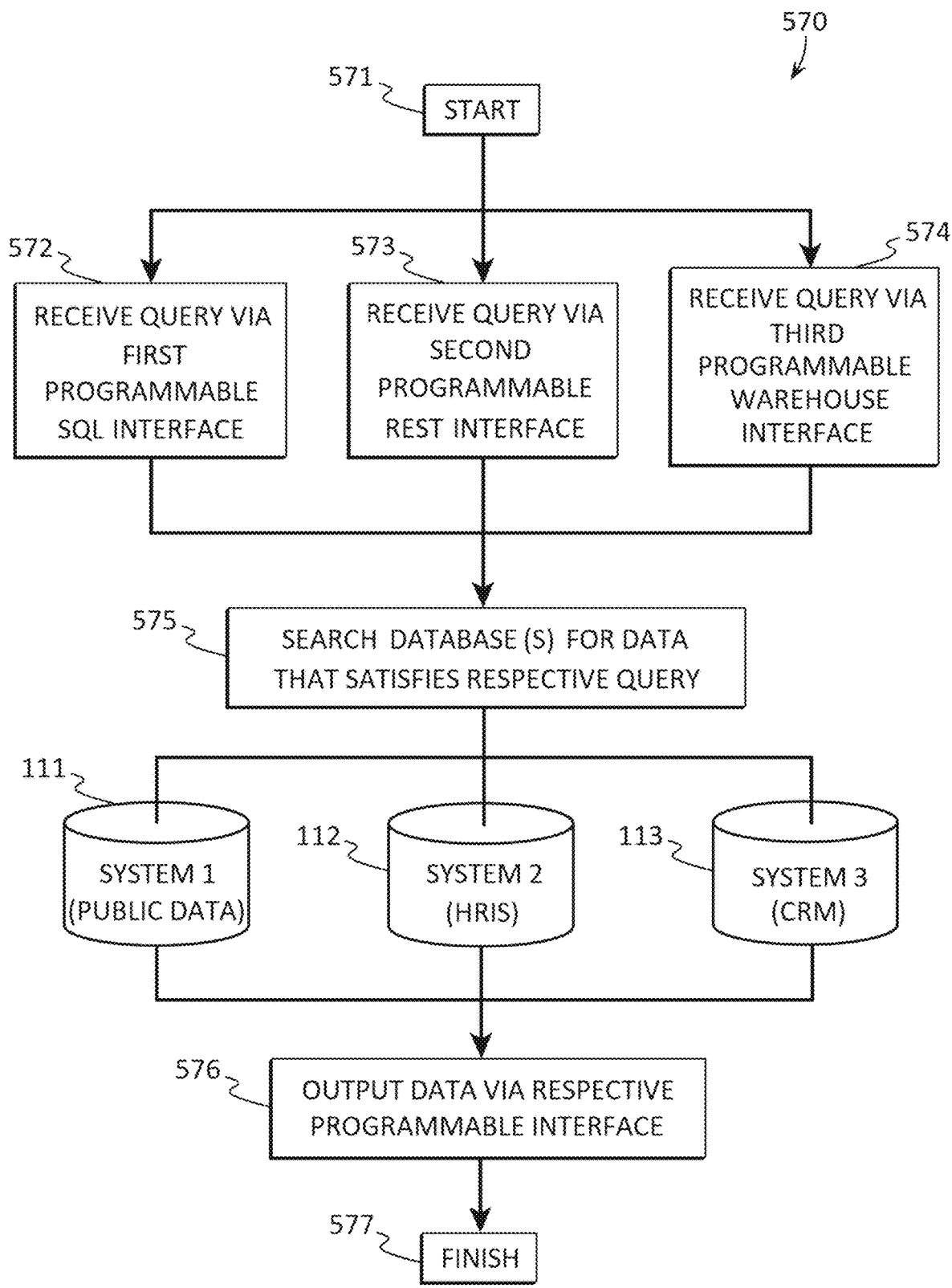
FIG. 13 depicts a block diagram of an example of a method of providing a self-adjusting application program interface according to various embodiments described herein.

In step 555, the API engine 325 may provide a self adjusting application program interface which may enable data of the system database 330 to be accessed by users 101 to perform a variety of functions with the data in the system database 330, such as querying and modeling insights for profiles or aggregated profile records 150 in the system database 330 across range of features from the data extracted from disparate data sources 111, 112, 113, that has been aggregated into the system database 330 as described in FIG. 13. After step 555, the method 550 may finish 556.

FIG. 13 illustrates a block diagram of an example of a method of providing a self-adjusting application program interface ("the method") 570 according to various embodiments described herein. The method 570 may be used to provide a self-adjusting application program interface (API) that lets users 101 perform a variety of functions with the data in the system database 330, such as querying and modeling insights for profiles or aggregated profile records 150 in the system database 330 across range of features from the data extracted from disparate data sources 111, 112, 113, that has been aggregated into the system database 330.

In some embodiments, the method 570 may start 571 and the API engine 325 may receive a query or other data manipulation instruction from a programmable interface in steps 572, 573, and/or 574. In preferred embodiments, the self-adjusting API provided by the API engine 325 may be query-able via a web service, a Structured Query Language (SQL) query, a 3rd party visualization tool that can support SQL, non SQL or non relational (NOSQL) dialect, or any other programmable interface. The API engine 325 may function as a self-adjusting API by enabling any number of consumers or users 101 to search, query, and model insights into the data model of the system database 330 through a first programmable interface 572, a second programmable interface 573, a third programmable interface 574, and/or any other number or types of programmable interfaces preferably via the client device 400 of the respective consumers or users 101.

In step 575, the aggregation module 321, via an API engine 325 and/or database engine 324 may search one or more databases and data sources 111, 112, 113, such as the system database 330, public database systems, Human Resources Information Systems (HRIS), and Candidate Relationship Management (CRM) systems, for data that satisfies respective query of a consumer or user 101. In preferred embodiments, the aggregation module 321 may search across a plurality of databases and data sources 111, 112, 113, for features to populate an aggregated profile 150 from multiple databases and multiple data sources (providing a Self-adjusting API) for data that satisfies respective query of a consumer or user 101. The API engine 325 may function as a self-adjusting API by enabling any number of consumers or users 101 to search, query, and model insights into the data model of the system database 330 which the API engine 325 self-adjusted to aggregate talent data or feature data from one or more disparate data sources 111, 112, 113.

In step 575, the API engine 325 may output data to the consumers or users 101 via the respective programmable interface they originally used through their respective client device 400 that satisfies their respective query(s). After step 575, the method 570 may finish 576.

It will be appreciated that some exemplary embodiments described herein may include one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the two approaches may be used. Moreover, some exemplary embodiments may be implemented as a computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), a Flash memory, and the like.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

A computer program (also known as a program, software, software application, application, script, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Additionally, the logic flows and structure block diagrams described in this patent document, which describe particular methods and/or corresponding acts in support of steps and corresponding functions in support of disclosed structural means, may also be utilized to implement corresponding software structures and algorithms, and equivalents thereof. The processes and logic flows described in this specification can be performed by one or more programmable processors executing one or more computer programs to perform functions by operating on input data and generating output.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, solid state drives, or optical disks. However, a computer need not have such devices.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network or the cloud. The relationship of client and server arises by virtue of computer programs running on the respective computers and having a client server relationship to each other.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

The computer system may also include a main memory, such as a random access memory (RAM) or other dynamic storage device (e.g., dynamic RAM (DRAM), static RAM (SRAM), and synchronous DRAM (SDRAM)), coupled to the bus for storing information and instructions to be executed by processor. In addition, the main memory may be used for storing temporary variables or other intermediate information during the execution of instructions by the processor. The computer system may further include a read only memory (ROM) or other static storage device (e.g., programmable ROM (PROM), erasable PROM (EPROM), and electrically erasable PROM (EEPROM)) coupled to the bus for storing static information and instructions for the processor.

The computer system may also include a disk controller coupled to the bus to control one or more storage devices for storing information and instructions, such as a magnetic hard disk, and a removable media drive (e.g., floppy disk drive, read-only compact disc drive, read/write compact disc drive, compact disc jukebox, tape drive, and removable magneto-optical drive). The storage devices may be added to the computer system using an appropriate device interface (e.g., small computer system interface (SCSI), integrated device electronics (IDE), enhanced-IDE (E-IDE), direct memory access (DMA), or ultra-DMA).

The computer system may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system may also include a display controller coupled to the bus to control a display, such as a cathode ray tube (CRT), liquid crystal display (LCD) or any other type of display, for displaying information to a computer user. The computer system may also include input devices, such as a keyboard and a pointing device, for interacting with a computer user and providing information to the processor. Additionally, a touch screen could be employed in conjunction with display. The pointing device, for example, may be a mouse, a trackball, or a pointing stick for communicating direction information and command selections to the processor and for controlling cursor movement on the display. In addition, a printer may provide printed listings of data stored and/or generated by the computer system.

The computer system performs a portion or all of the processing steps of the invention in response to the processor executing one or more sequences of one or more instructions contained in a memory, such as the main memory. Such instructions may be read into the main memory from another computer readable medium, such as a hard disk or a removable media drive. One or more processors in a multi-processing arrangement may also be employed to execute the sequences of instructions contained in main memory. In alternative embodiments, hard-wired circuitry may be used in place of or in combination with software instructions. Thus, embodiments are not limited to any specific combination of hardware circuitry and software.

As stated above, the computer system includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present invention includes software for controlling the computer system, for driving a device or devices for implementing the invention, and for enabling the computer system to interact with a human user. Such software may include, but is not limited to, device drivers, operating systems, development tools, and applications software. Such computer readable media further includes the computer program product of the present invention for performing all or a portion (if processing is distributed) of the processing performed in implementing the invention.

The computer code or software code of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

Various forms of computer readable media may be involved in carrying out one or more sequences of one or more instructions to processor for execution. For example, the instructions may initially be carried on a magnetic disk of a remote computer. The remote computer can load the instructions for implementing all or a portion of the present invention remotely into a dynamic memory and send the instructions over the air (e.g. through a wireless cellular network or wifi network). A modem local to the computer system may receive the data over the air and use an infrared transmitter to convert the data to an infrared signal. An infrared detector coupled to the bus can receive the data carried in the infrared signal and place the data on the bus. The bus carries the data to the main memory, from which the processor retrieves and executes the instructions. The instructions received by the main memory may optionally be stored on storage device either before or after execution by processor.

The computer system also includes a communication interface coupled to the bus. The communication interface provides a two-way data communication coupling to a network link that is connected to, for example, a local area network (LAN), or to another communications network such as the Internet. For example, the communication interface may be a network interface card to attach to any packet switched LAN. As another example, the communication interface may be an asymmetrical digital subscriber line (ADSL) card, an integrated services digital network (ISDN) card or a modem to provide a data communication connection to a corresponding type of communications line. Wireless links may also be implemented. In any such implementation, the communication interface sends and receives electrical, electromagnetic or optical signals that carry digital data streams representing various types of information.

The network link typically provides data communication to the cloud through one or more networks to other data devices. For example, the network link may provide a connection to another computer or remotely located presentation device through a local network (e.g., a LAN) or through equipment operated by a service provider, which provides communication services through a communications network. In preferred embodiments, the local network and the communications network preferably use electrical, electromagnetic, or optical signals that carry digital data streams. The signals through the various networks and the signals on the network link and through the communication interface, which carry the digital data to and from the computer system, are exemplary forms of carrier waves transporting the information. The computer system can transmit and receive data, including program code, through the network(s) and, the network link and the communication interface. Moreover, the network link may provide a connection through a LAN to a client device such as a personal digital assistant (PDA), laptop computer, or cellular telephone. The LAN communications network and the other communications networks such as cellular wireless and wifi networks may use electrical, electromagnetic or optical signals that carry digital data streams. The processor system can transmit notifications and receive data, including program code, through the network(s), the network link and the communication interface.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A computer implemented method for disparate data source aggregation, the method comprising the steps of:
    extracting, via a computing device processor, a first feature set having a plurality of first extracted features from a first data set of a first data source and extracting via a computing device processor, a second feature set having a plurality of second extracted features from a second data set of a second data source and wherein both the first data set and the second data set do not have a common unique identifier;
    determining, via a computing device processor, whether the first feature set matches the second feature set, wherein the determining whether the first feature set matches the second feature set comprises comparing the plurality of first extracted features to the plurality of second extracted features to determine a number of matching extracted features between the first feature set and the second feature set;
    in response to determining that the number of matching extracted features between the first feature set and the second feature set meets or exceeds a matching threshold number, aggregating, via a computing device processor, the first feature set with the second feature set; and
    storing, via a computing device processor, the aggregated first feature set and aggregated second feature set as an aggregated profile record in a system database.

2. The computer implemented method of claim 1, further comprising automatically self-adjusting the aggregated profile record of the system database.

3. The computer implemented method of claim 1, wherein the first extracted feature and the second extracted feature are extracted via natural language processing.

4. The computer implemented method of claim 1, wherein the first extracted feature is periodically extracted from the first data set, and wherein the second extracted feature is periodically extracted from the second data set.

5. The computer implemented method of claim 1, further providing, via computing device processor, aggregated data from the system database to a third party system.

6. The computer implemented method of claim 1, further comprising providing, via computing device processor, a self-adjusting application program interface.

7. The computer implemented method of claim 1, further comprising a self-adjusting application program interface operation, the operation comprising:
    receiving, via a computing device processor, a first query from a first programmable interface;
    searching, via a computing device processor, a system database for data that satisfies the first query; and
    outputting data, via a computing device processor and the first programmable interface, data that satisfies the first query.

8. The computer implemented method of claim 7, wherein the first query comprises a request for a feature from an aggregated profile record.

9. The computer implemented method of claim 7, wherein the first programmable interface comprises a programmable interface selected from the group consisting of a web service, a Structured Query Language query, a 3rd party visualization tool that can support Structured Query Language, a 3rd party visualization tool that can support non relational Structured Query Language.

10. The computer implemented method of claim 7, further comprising storing, via a computing device processor, the aggregated first feature set and second feature set in an aggregated profile record in a system database.

11. The computer implemented method of claim 7, further comprising automatically self-adjusting the aggregated profile record of the system database.

12. The computer implemented method of claim 7, wherein the first extracted feature and the second extracted feature are extracted via natural language processing.

13. The computer implemented method of claim 7, wherein the first extracted feature is periodically extracted from the first data set, and wherein the second extracted feature is periodically extracted from the first data set.

14. The computer implemented method of claim 7, further comprising providing, via computing device processor, aggregated data from the system database to a third party system.

15. The computer implemented method of claim 7, further comprising providing, via computing device processor, a self-adjusting application program interface.

16. The computer implemented method of claim 1, wherein the first data set comprises structured data and the second data set comprises unstructured data.

17. The computer implemented method of claim 16, wherein the unstructured data is a resume document file.

18. The computer implemented method of claim 16, wherein the unstructured data is an image file.

19. The computer implemented method of claim 16, wherein the unstructured data is a web page.

20. A non-transitory, computer-readable medium coupled to one or more processors and having instructions stored thereon which, when executed by the one or more processors, cause the one or more processors to perform operations, the operations comprising:
    extracting, via a computing device processor, a first feature set having a plurality of first extracted features from a first data set of a first data source and extracting via a computing device processor, a second feature set having a plurality of second extracted features from a second data set of a second data source and wherein both the first data set and the second data set do not have a common unique identifier;
    determining, via a computing device processor, whether the first feature set matches the second feature set, wherein the determining whether the first feature set matches the second feature set comprises comparing the plurality of first extracted features to the plurality of second extracted features to determine a number of matching extracted features between the first feature set and the second feature set;
    in response to determining that the number of matching extracted features between the first feature set and the second feature set meets or exceeds a matching threshold number, aggregating, via a computing device processor, the first feature set with the second feature set; and storing, via a computing device processor, the aggregated first feature set and aggregated second feature set as an aggregated profile record in a system database.

\* \* \* \* \*